United States Patent [19]

Dumbaugh et al.

[11] 4,149,627
[45] Apr. 17, 1979

[54] VIBRATORY CONVEYOR IMPROVEMENT

[75] Inventors: George D. Dumbaugh, Lousiville; Franklin E. Whitson, Jeffersontown, both of Ky.

[73] Assignee: Vibranetics, Inc., Louisville, Ky.

[21] Appl. No.: 812,141

[22] Filed: Jul. 1, 1977

[51] Int. Cl.² .............................................. B65G 27/20
[52] U.S. Cl. ..................................... 198/770; 198/766
[58] Field of Search ............... 198/609, 761, 758, 762, 198/766–770; 74/61, 87; 222/161

[56] References Cited

U.S. PATENT DOCUMENTS

| 2,830,696 | 4/1958 | Musschoot | 198/767 |
| 3,251,457 | 5/1966 | Dumbaugh | 198/762 |
| 3,659,465 | 5/1972 | Oshima et al. | 198/758 |
| 3,744,676 | 7/1973 | Dumbaugh | 222/161 |

FOREIGN PATENT DOCUMENTS 584435  9/1933  Fed. Rep. of Germany ........... 198/766

*Primary Examiner*—Joseph E. Valenza
*Attorney, Agent, or Firm*—Harry B. O'Donnell, III

[57] ABSTRACT

This invention provides an improvement in a vibratory conveyor of the type including an elongate utilized container, which can be vibrated as a free mass at a selected frequency and stroke by drive means, such as a motor having weights eccentrically mounted on its output shaft, and which container is interconnected by yieldable means to elongate counterbalance means located opposite one long side of the container and with the stroke axis of the container being inclined with respect to the long central axis of the container. Basically, the improvement of the present invention is that the counterbalance means is comprised of plural counterbalance sections which are longitudinally arranged generally parallel to the long central axis of the container. Preferably, the plural counterbalance sections are interconnected to one another by connector means that are generally rigid in a direction perpendicular to the stroke axis of the container so as to inhibit relative movement between the counterbalance sections in that direction but are also constructed so as to permit relative movement between the counterbalance sections in a direction parallel to the stroke axis of the container. The improvement of the present invention is particularly beneficial wherein the unitized container has a length of greater than thirty feet.

2 Claims, 3 Drawing Figures

VIBRATORY CONVEYOR IMPROVEMENT

BACKGROUND OF THE INVENTION

This invention relates to vibratory conveyors and, more particularly, to an improvement in a vibratory conveyor of the type including an elongate unitized container, which can be vibrated as a free mass at a selected frequency and stroke by drive means comprising a motor having weights eccentrically mounted on its output shaft and that is interconnected by yieldable means to elongate counterbalance means located opposite one long side of the container with the long central axis thereof arranged generally parallel to that of the container.

The improvement of the present invention is particularly beneficial when incorporated into an elongate version of a vibratory conveyor of the type illustrated in FIG. 3 of U.S. Pat. No. 3,251,457 that is to be mounted in the upper levels of a building rather than secured to earth. Under such circumstances, it has, in the past, been common practice to provide such a vibratory conveyor with elongate counterbalance means, rather than with the conventional base member which is shown and described in the aforenoted FIG. 3 of the aforenoted U.S. Pat. No. 3,251,457. And, heretofore, such counterbalance means has consisted of an elongate unitized counterbalance member which has been located opposite one long side of the elongate unitized container with its long central axis arranged generally parallel to that of the container.

This just-described prior-art arrangement has been generally satisfactory for such vibratory conveyors wherein the length of the elongate unitized container therefor has not exceeded thirty feet. However, considerable problems have been encountered with it wherein the length of the elongate unitized container of the vibratory conveyor was greater than thirty feet. More specifically, the opposite ends and centers of both the elongate unitized container and the elongate unitized counterbalance member tended to deflect or bend relative to their respective long central axes and thus cause loss of conveyability of the materials carried by the container.

In accordance with the improvement that is provided by the present invention, it has been found that these just-noted problems can be overcome by employing for the elongate counterbalance means of a vibratory conveyor of the aforedescribed type plural counterbalance sections rather than a single elongate counterbalance member.

SUMMARY OF THE INVENTION

The present invention provides an improvement in a vibratory conveyor of the type including an elongate unitized container, which can be vibrated as a free mass at a selected frequency and stroke by drive means comprising a motor having weights eccentrically mounted on its output shaft and that is interconnected by yieldable means to elongate counterbalance means located opposite one long side of the container with the long central axis thereof arranged generally parallel to that of the container.

Basically, the improvement of the present invention is that the counterbalance means is comprised of plural counterbalance sections which are longitudinally arranged generally parallel to the long central axis of the container. Preferably, the plural counterbalance sections are interconnected to one another by connector means that are generally rigid in a direction perpendicular to the stroke axis of the container but are generally resilient in a direction parallel to the stroke axis of the container. The improvement of the present invention is particularly beneficial wherein the unitized container has a length of greater than thirty feet.

BRIEF DESCRIPTION OF THE DRAWING

The present invention is illustrated in the accompanying drawing, wherein.

DETAILED DESCRIPTION

Figure 2:
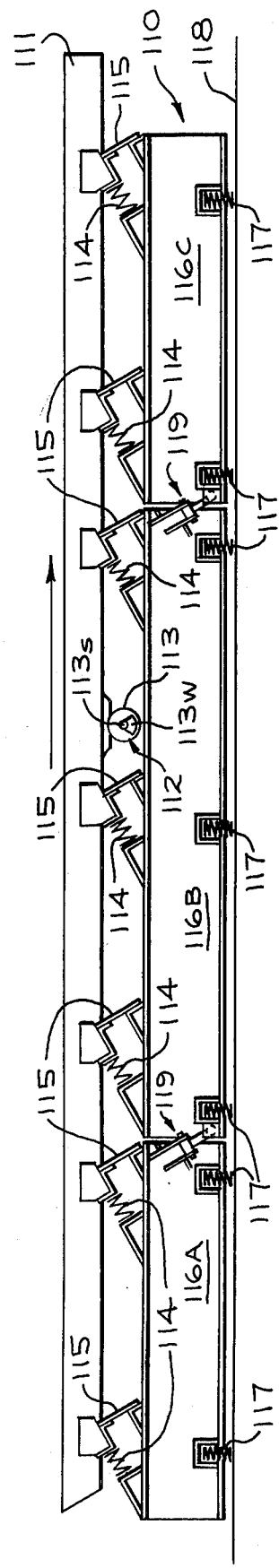
FIG. 2 is a view similar to FIG. 1, but illustrating a presently preferred embodiment of the improvement of the present invention being incorporated into the vibratory conveyor.
Figure 3:
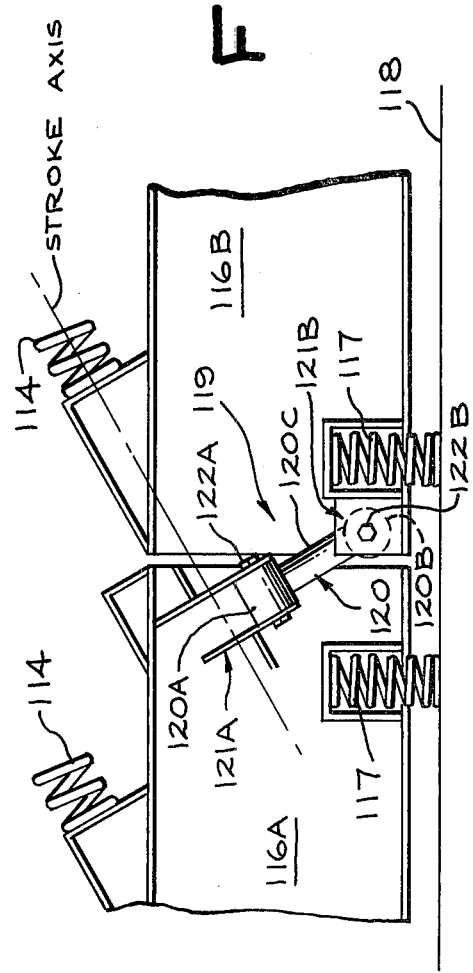
FIG. 3 is a greatly enlarged fragmentary view illustrating in detail a form of the connector means that are preferably employed to interconnect the plural conveyor counterbalance sections in accordance with the improvement of the present invention.

Turning now to the drawing, it can be seen that the basic structure of the unimproved conventional vibratory conveyor 10 (FIG. 1) and of the improved vibratory conveyor 110 of my present invention (FIG. 2) are somewhat similar, in that both are an elongate version of a vibratory conveyor of the type illustrated in FIG. 3 of U.S. Pat. No. 3,251,457 that is to be mounted to the upper levels of a building rather than secured to earth.

Both of the presently illustrated vibratory conveyors 10 or 110 include an elongate unitized container or trough 11 or 111 which can be vibrated as a free mass at a selected frequency and stroke by drive means 12 or 112 comprising a three-phase A.C. squirrel cage electric motor 13 or 113 that has its housing connected thereto and which has weights 13W or 113W (only one of which is shown in the drawings) eccentrically mounted on the opposite ends (only one of which is illustrated in the drawings) of its output shaft 13S or 113S. And, the elongate unitized container 11 or 111 of the conveyors 10 or 110 is interconnected by yieldable means, such as the illustrated plural, spaced-apart coil springs 14 or 114 and leaf springs 15 or 115, to elongate counterbalance means 16 or 116 located opposite one long side of the container 11 or 111 with the long central axis thereof arranged generally parallel to that of the container 11 or 111. Furthermore, in both cases, the central axes of the coil springs 14 or 114 are arranged parallel to the stroke axis of the container 11 or 111 and the elongate counterbalance means 16 or 116 is mounted through plural, generally vertically-arranged, spaced-apart isolation springs 17 or 117 to a structural member 18 or 118 of which the upper level of a building is comprised.

The illustrated container 11 or 111 comprises a trough that is defined by a bottom wall, side walls and one end wall, with the forward or right end of the trough or container being open. It is to a point located under this open end of the container 11 or 111 that bulk particulate material, such as sand, gravel, and the like is delivered by the vibratory conveyor 10 or 110 at some selected rate of speed. This bulk of material is usually placed in the rear or left end of the container 11 or 111 from an overhead discharge bin or an overhead conveyor, or some other similar means (not shown).

Figure 1:
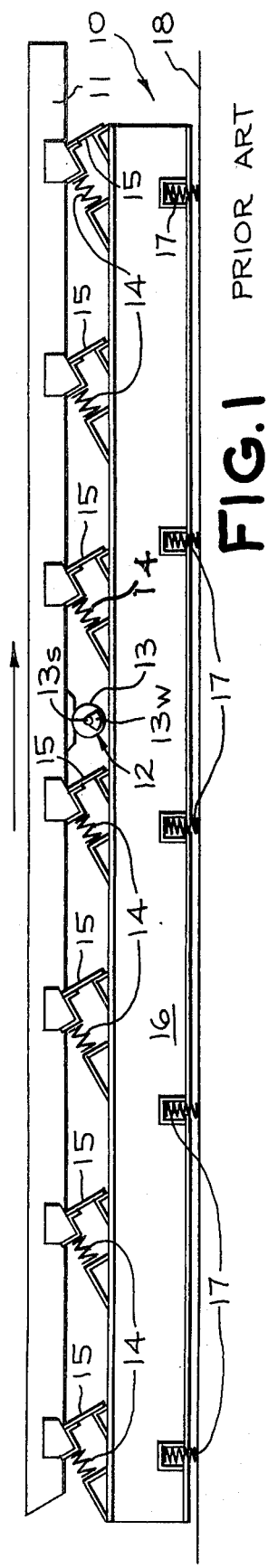
FIG. 1 is a somewhat schematic right-side elevational view of a conventional elongate vibratory conveyor of a type into which the improvement of the present invention can be advantageously incorporated, but with said improvement being absent therefrom.

The drive means 12 or 112 for vibrating the container 11 or 111 at a selected frequency and stroke for moving the particulate material contained within the container generally along the long central axis thereof in the direction shown by the arrows illustrated in FIGS. 1 and 2 comprises the aforenoted three-phase A.C. squirrel cage electric motor 13 or 113. And, preferably, that motor 13 or 113 is provided with control means (not shown), such as those described in detail in U.S. Pat. No. 4,015,705 or in the aforenoted U.S. Pat. No. 3,251,457 whereby the rate of feed can be controlled through selectively varying the voltage that is applied to the motor 13 or 113 to thus cause the container or trough 11 or 111 to be vibrated as a free mass at a selected frequency and stroke.

The aforenoted weights 13W or 113W are usually fixed to the opposite ends (only one of which is shown) of the motor output shaft 13S or 113S in a parallel relationship, although, in some instances, it may be desirable to vary their angular relative positions to achieve adjustment of the effective eccentric mass operating on the vibratory conveyor system, or adjusting weights may be added or subtracted from the eccentric weights 13W or 113W as required. While not illustrated, shrouds cover the ends of the motor output shaft 13S or 113S to protect operating personnel from the revolving eccentric weights.

The aforenoted coil springs 14 or 114 are preferably selected with K Factors, that is, spring rates, which are appropriately related to the frequency of the motor drive, the mass of the motor drive component, and the total mass of the driven vibratory system, so that under normal synchronous speed of the drive motor, the plural coil springs 14 or 114 will be at or near natural frequency with the system. In other words, for ideal operation, the vibratory system with its exciter drive is designed to operate at as close to the natural frequency of the system as in the manner well-known to the art. And, as further illustrated and previously noted above, these plural coil springs 14 or 114 have their central axes arranged parallel to the stroke axis of the container 11 or 111. The leaf springs 15 or 115 serve to restrain the container 11 or 111 from lateral movement with respect to its long central axis.

The major distinction between the improved free mass vibratory conveyor 110 of the present invention (FIG. 2) and the unimproved conventional free mass vibratory conveyor 10 (FIG. 1) lies in the novel construction of the new counterbalance means 116 of plural counterbalance sections 116A, 116B and 116C rather than of a single unitized elongate counterbalance member 16.

As previously noted above, the prior-art structure (FIG. 1) has been generally satisfactory for free mass vibratory conveyor 10 that is to be mounted in the upper levels of a building rather than secured to earth wherein the length of the elongate unitized container 11 therefor has not exceeded thirty feet. However, considerable problems have been encountered with it wherein the length of the elongate unitized container 11 of the vibratory conveyor 10 was greater than thirty feet. More specifically, the opposite ends and centers of both the elongate unitized container 11 and the elongate unitized counterbalance member 16 tended to deflect or bend relative to their respective long central axes and thus cause loss of conveyability of the materials carried by the container 11. Such deflection has been in a generally vertical direction as viewed in drawing FIG. 1 with the opposite ends being simultaneously deflected in a first direction while the centers were being deflected in an opposite second direction.

In particular accordance with the present invention, it has been found that this just-noted problem that has existed with the prior-art form of free mass vibratory conveyor 10 that is illustrated in drawing FIG. 1 can be overcome by employing for the elongate counterbalance means 116 of the improved free mass vibratory conveyor 110 that is illustrated in drawing FIG. 2 plural counterbalance sections 116A, 116B and 116C which are longitudinally arranged generally parallel to the long central axis of the single elongate unitized container 111 of the improved free mass vibratory conveyor 110.

As further shown in drawing FIGS. 2 and 3, the plural counterbalance sections 116A, 116B and 116C of the counterbalance means 116 of the improved free mass vibratory conveyor 110 that is provided in accordance with the present invention are preferably interconnected to one another by connector means 119 that are generally rigid in a direction perpendicular to the stroke axis of the container 111 but are generally resilient in a direction parallel to the stroke axis of that container 111. And, as yet further shown in detail in drawing FIG. 3, the connector means 119 desirably comprise a plurality of suspending and vibration isolating members 120, such as those that have been previously shown and described in detail in U.S. Pat. No. 3,744,676 and each of which includes a rigid central portion 120C that is arranged between two of the counterbalance sections with its long central axis perpendicular to the stroke axis of the container 111 and first and second hollow end portions 120A and 120B located at opposite ends of its rigid central portion 120A, which can be respectively connected to bracket means 121A and 121B that are respectively provided on each of two adjacent counterbalance sections. Each of those hollow end portions 120A and 120B of each such connecting member 120 is lined with a vibration isolating sleeve that is made of a resilient material, such as elastomeric compound, and has a bore therethrough for receiving fastener means, such as the illustrated bolts 122A and 122B, for respectively fastening those end portions 120A and 120B to the bracket means provided on the adjacent counterbalance sections, such as to the bracket means 121A and 121B shown on adjacent counterbalance sections 116A and 116B as illustrated in drawing FIG. 3.

It should be apparent that while there has been described what is presently considered to be a presently preferred embodiment of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of the present invention.

What is claimed is:

1. In a vibratory conveyor of the type including an elongate unitized container, which can be vibrated as a free mass at a selected frequency and stroke by drive means, such as a motor having weights eccentrically mounted on its output shaft, and which container is interconnected by yieldable means to elongate counterbalance means located opposite one long side of said container with the long central axis thereof arranged generally parallel to that of said container, and with the stroke axis of said container being inclined with respect to said long central axis of said container, an improvement wherein said counterbalance means is comprised of plural counterbalance sections which are longitudinally arranged generally parallel to said long central axis of said container and said plural counterbalance sections are interconnected to one another by connector means that are generally rigid in a direction perpendicular to said stroke axis of said container so as to inhibit relative movement between said counterbalance sections in that direction but are also constructed so as to permit relative movement between said counterbalance sections in a direction parallel to said stroke axis of said container.

2. The invention of claim 1, wherein said unitized container has a length of greater than thirty feet.

* * * * *